United States Patent [19]
Fan et al.

[11] 3,988,739
[45] Oct. 26, 1976

[54] INPUT DEVICE FOR SCANNING DOCUMENTS WITH MAGNETIC BUBBLE PRINTING

[75] Inventors: George J. Fan, Ossining, N.Y.; Eugene Shapiro, Stamford, Conn.

[73] Assignee: International Business Machines Corporation, Armonk, N.Y.

[22] Filed: Mar. 26, 1975

[21] Appl. No.: 562,076

[52] U.S. Cl. .......................... 346/74.1; 340/174 TF
[51] Int. Cl.² .................................... G03G 19/00
[58] Field of Search ............... 346/74.1; 340/174 TF

[56] References Cited
UNITED STATES PATENTS

| | | | |
|---|---|---|---|
| 3,793,640 | 2/1974 | Potgiesser | 340/174 TF |
| 3,840,865 | 10/1974 | Holtzberg et al. | 340/174 TF |

OTHER PUBLICATIONS
IBM Tech Disc Bull, vol. 14, No. 7, Dec. 1971, p. 2121; "Bubble Domain Sensor Arrays . . ." Chang et al.

*Primary Examiner*—Jay P. Lucas
*Attorney, Agent, or Firm*—D. Kendall Cooper; Jack M. Arnold

[57] ABSTRACT

A scanner transfers information in the form of magnetic characters to a soft magnetic film, and subsequently transfers the information to a storage medium, such as disc, tape, or the like. Use of amorphous and other bubble material is suggested. A bias field is coupled through the magnetic characters to the material in which bubbles are generated and transported.

10 Claims, 3 Drawing Figures

INPUT DEVICE FOR SCANNING DOCUMENTS WITH MAGNETIC BUBBLE PRINTING

BACKGROUND OF INVENTION, FIELD, AND PRIOR ART

Conventional ways of converting written non-coded information (NCI) to machine readable form involve scanning the document with an optical beam, such as in optical character recognition (OCR) devices. For background, see the IEEE Special issue on Pattern Recognition, October 1972; or the article — P. L. Anderson, "OCR Enters Practical Stage" DATAMATION, Dec. 1, 1971. For magnetic ink, at times, as in the case of bank checks, one can read the characters with a magnetic head. A third way of converting printed information, is proposed herein which involves the magnetic transfer of the characters to a soft magnetic material, such as amorphous bubble material. The transfer can be made with the addition of a bias field. Of interest are IEEE Transactions on Magnetics, MAG-5 544 (1969), and the article by A. H. Bobeck, "Magnetic Bubble Domain Device," Paper 5–2, Intermag Conference, 1971.

It is known to copy magnetic master tapes containing conventional coded information thereon on a transfer drum and subsequently on a tape with the application of bias fields. However in these systems both the starting and final records comprise coded information on continuous magnetic tapes, drums, discs and the like.

It is known that in certain magnetic film material, under a bias field, will support circular magnetic domains with magnetization axis perpendicular to the film plane. These circular domains, magnetic bubbles, can be moved by field gradient. The field gradient can be obtained by using the combination of photolithography and an applied field. The application of these devices in memory and storage applications is known.

The present invention provides, in one embodiment, a scanner making use of a bubble plate for transfer of information. Circuits and structures are provided for populating, that is filling the bubble plate initially, feeding a document into close proximity with the plate, establishing a field bias relative to the document and plate which achieves an imaging effect of the information on the document into the bubble plate, thereafter moving the plate away from the document, feeding the document out, and shifting the information contained in the bubble plate to another device, such as a storage unit, or the like. Another embodiment utilizes drum members for the bubble and bias elements and this embodiment can be provided with a toner development adjunct. Such an adjunct could also be provided, if desired, in connection with the plate embodiment.

OBJECTS

A primary object of the present invention is to provide apparatus for transfer of information from one medium to another, particularly useful in connection with non-coded information transfer.

Another object of the present invention is to provide a system of this nature that is operable in a highly efficient manner to transfer information.

Still another object of the present invention is to provide apparatus of this nature wherein complex scanning mechanisms are eliminated, enabling faster transfer of information. Still another object of the present invention is to provide apparatus of this nature which is of simple design and which eliminates items ordinarily encountered in other types of scanners, such as optical scanners.

The foregoing and other objects, features, and advantages of the invention will be apparent from the following more particular description of various embodiments of the invention as illustrated in the accompanying drawings.

DRAWINGS

DETAILED DESCRIPTION

Figure 1:
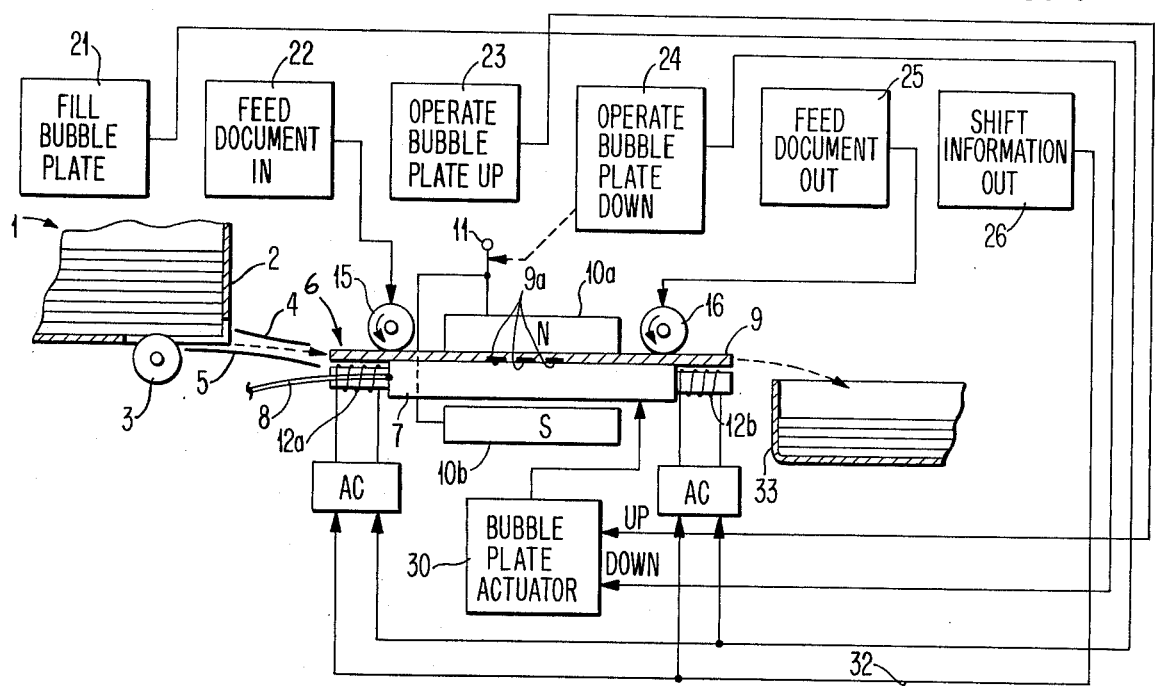
FIG. 1 illustrates a system for scanning information from a document and includes various structures and timing networks, utilizing a bubble plate.

As indicated in the summary of the invention, the present inventive arrangements make use of a magnetic film material arranged in a highly efficient scanning apparatus.

The magnetic material only obtains bubbles in a narrow range of applied fields. In most material, a bias field of the order of approximately $0.3(4\pi M_s)$, where $M_s$ = saturation magnetization of the bubble material, is needed to sustain the domain. If the bias field is increased, the domain would collapse and if it is decreased the bubble goes into a serpentine pattern (or snake-like domain). The ratio of the "collapse field" to "serpentine field" is approximately 1.6. Hence if the material is ideally biased, a 30% change of the bias field can collapse the bubble. If the material is critically biased, a 10% change of the bias field would be sufficient to collapse the bubble.

One mechanism to implement a bubble scanner is to have a bubble material placed in a biased magnetic field. The bubble material is fully populated with $5\mu$ to $10\mu$ bubbles, for example. The bubbles are biased in a stable region. Then a document printed with magnetic ink is brought into contact with the bubble material.

It is clear that in the region where there is magnetic ink the field is the strongest. One can raise the applied field until all the bubbles under the magnetic ink are collapsed, but the field is not strong enough to collapse the bubbles elsewhere. Removing the document, an image of it remains in the bubble plate and the information can be shifted out by electronic means. Another implementation is proposed where the biased magnet and the film are placed on cylinders, for easy paper handling. In this configuration, since only point contact is made between the cylinders and the paper, the material can be critically biased at all times (the process of increasing the field is not important).

To illustrate, the scanner can be a line scanner where the height of the film would be greater than the character height (approximately 4 mm) and the diameter of the cylinder ~ 5 mm. To scan a given line, one rolls the cylinder over a printed line. The bubble film is initially fully populated; on contact with the printed area the bubbles collapse. After the printed area leaves the contact area the bubbles are shifted out and the film repopulated. The speed of bubble action is rather fast ($10^4$ cm/sec) and if one assumes the printed material has 240 pel, one channel of electronics can handle a 10 inch line in less than 1 sec. Speed can be increased if more channels of electronics are used in parallel.

The same principle is used to construct a page scanner, where one uses a film of the width of the printed page. Information is printed on the long bubble material a line at a time and shifted out in the direction perpendicular to the motion. The time to scan a page would again be approximately 1 sec.

Other effects of interaction between the bubble material and the printed material can also be used. It has been observed that when an in-plane field is applied to a magnetic ink dot it can influence the dynamics of the bubble contiguous to the dot. Hence this effect can be used as a gate to raster magnetically printed information to a bubble material.

Yet another way of using this system configuration is that the magnetic bubble drum can be toned with magnetic toner. Hence the drum can be used as a copying device. A copy can also be generated from the scanner in conjunction with an ink jet output device.

Advantages of this scheme are:

It makes unnecessary the scanning of the document by a mechanical or optical transducer. It uses a simple printing process and then the data is handled electronically. It affords a way of reducing the physical size of the document without an additional recording step. It offers very high speed of transfer of NCI to machine readable information. The transfer device is rather simple and of low cost.

Figure 2:
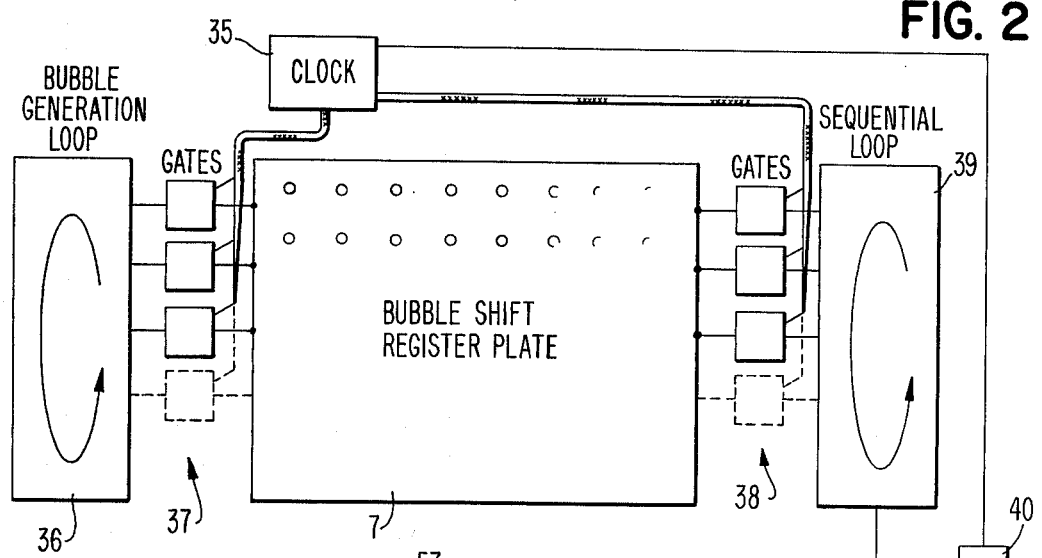
FIG. 2 represents the bubble plate from another standpoint and further incorporates various gating and loop circuits associated therewith.

FIG. 1 comprises a number of structures and circuits for transferring information from printed documents, the information having been previously recorded with magnetic ink, for example. Documents 1 are stored in a hopper 2 and fed by means of a feed roll 3 through guide members 4 and 5 into a transfer station 6 in order to effect transfer of the information contained on each document in succession into bubble material 7. The information magnetically transferred into bubble material 7 is subsequently transferred out to a utilization device by cable 8. Other details of interest in this connection are shown in FIG. 2. The printed material which forms the input is conventional printed matter designed for reading by the human observer and is not in machine readable coded form although the ink is magnetic in nature.

Other items of interest include elements 10a and 10b, for continually applying a bias field to bubble material 7 by energization from terminal 11. Elements 10a and 10b serve to establish north and south poles in the biasing operation. Coils 12a and 12b are provided to enable filling, that is populating, of bubble plate 7 at appropriate times during operation as well as shifting of information from bubble plate 7 over cable 8. Feed roll 15 is provided to feed a document into position for reading and feed roll 16 is provided in order to feed a document out after the reading operation has been completed. Arranged in FIG. 1 is a series of blocks representing a sequence of operations for the apparatus. These blocks are designated 21–26 and represent operations 1–6.

Assuming that it is desired to transfer information from a document, block 21 is operated in order to fill bubble plate 7 thereby establishing an array of bubbles fairly uniformly distributed throughout plate 7. Thereafter block 22 is operated in conjunction with feed roll 15 in order to feed an original document such as document 9 into proximity with plate 7. Typically, document 9 has magnetic ink areas 9a on the underneath surface thereof. Following feeding of document 9 into position, bubble plate 7 is pressed upwardly against the underneath surface of document 9 by activation of block 23 and the bubble plate actuator 30. As a result of this operation, large numbers of bubbles collapse under the influence of the magnetic ink areas 9a and bubble plate 7 thereupon has an exact image or replica of the information represented by magnetic ink 9a.

Subsequently, block 24 is operated and activates the bubble plate actuator 30 in such a manner that plate 7 is moved downwardly away from document 9. Then document 9 is fed out of reading position by means of feed roll 16 in conjunction with block 25. It is noted that the movement of plate 7 downwardly is far enough from document 9 so that the stored image is not disturbed during transfer of document 9 out of the reading station.

As indicated, information stored in bubble material 7 is transferred out by cable 8 under control of the shift information out block 26 which activates coils 12a and 12b by way of line 32.

Referring to FIG. 2, some of the circuits already discussed are shown, but from a different standpoint. For example, plate 7 is shown in a planar form rather than from an edge as in FIG. 1. Besides plate 7, FIG. 2 illustrates a clock 35, a bubble generation loop 36, gate circuits 37, gate circuits 38, and a sequential loop network 39. The ultimate objective of the circuits of FIG. 2 is to condition plate 7 for entry of information and to thereafter scan the information in parallel for transfer in a serial manner to storage unit 41.

Loop networks 36 and 39 typically are circular shift registers. Considering the operation of the apparatus in FIG. 2 in a general way, bubble plate 7 is filled at an appropriate time as by means of activation of the block 21, FIG. 1, under the auspices of loop 36 and by means of gates 37 controlled by appropriate signals from clock 35. As will be recalled, document 9 is then moved into position, plate 7 is pressed against document 9 and the bubbles in plate 7 are shifted in such a manner that an image is formed in plate 7. Thereafter, gates 38 are operated to read information in parallel from plate 7 into loop 39, gates 38 being controlled by appropriate signals from clock 35. Subsequently, the information now stored in loop 39 is transferred in serial fashion by signal from clock 35 to gate 40 into storage member 41.

It is contemplated to provide a bubble member 7 that is dimensioned in such a manner that a line-by-line scan of document 9 is accomplished, rather than imaging the entire document.

Figure 3:
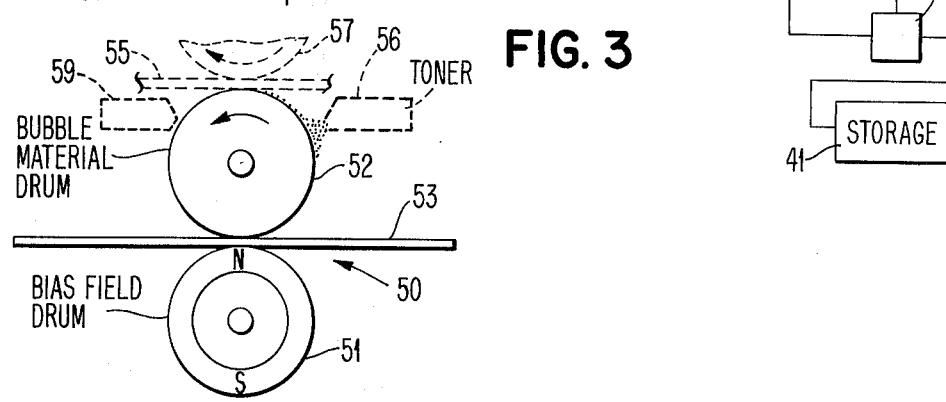
FIG. 3 illustrates an alternative embodiment wherein the bubble material is in the form of a drum.

Another configuration, and a modification thereof, are shown in FIG. 3. Document 53 is transported in the x-direction, passing a station 50 with bias field 51 and a drum 52 coated with an amorphous bubble material. The condition of the transfer of information from document 53 is rather simple since in a given magnetic field the air gap between the drum and the bias magnet is such that bubbles will not be nucleated without an intermediate magnetic material. With this intermediate magnetic ink, the air gap is reduced. A magnetic domain is formed on the amorphous material.

With the proper guiding magnetic pattern, as soon as the transfer takes place the magnetic information is shifted away from the drum to some storage film, thus continuous scan is possible.

As a modification, the magnetic image on drum 52 can be developed by toner, such as a liquid toner, from dispenser 56. An ink-like pattern is formed which is then transferred to plain paper 55 passing between drum 52 and drum 57. As drum 52 continues to rotate, the pattern is erased at cleaning station 59 thus preparing drum 52 for the next magnetic image.

A number of advantages are offered in the modification with respect to electrophotographic copying technology. These include:

1. Due to use of liquid toner, such as magnetic ink for printing no light source is needed. This reduces copier power, cost, and greatly improves usability from a human factor standpoint. (No exposure to intense light.)

2. There is no time delay between exposure of the drum surface to the magnetic ink original and availability of the magnetic bubble pattern image. Thus, greater copying speed is possible since allowance does not have to be made for image response time as with some organic photoconductors.

3. The exposure and development process does not imply a high wear system as in electrophotography, since carrier/toner tribo-electric effects, cascade development systems, magnetic brush systems and related functional phenomena are not required for image development. Clearly, fewer stations around the image drum and simpler, more reliable copying devices would result.

4. Hot roll or radiant fusing is not required.

It is known that a bubble on the amorphous material can be as small as $1\mu$ in diameter, while the width of the printed line is generally greater than $300\mu$; with proper reduction circuitry a reduction of $10^5$ in area is achievable. The reduced form is comparable to a microfilm as a form of permanent storage for the written document. In some cases, where security is of importance, the document can be re-secured while being shifted away from the drum, and it is clear this coding would be very difficult to decode if the original code key is not given.

While the invention has been particularly shown and described with reference to several embodiments, it will be understood by those skilled in the art that various changes in form and detail may be made without departing from the spirit and scope of the invention.

What is claimed is:

1. A method for recording information from a document having magnetic indicia thereon, said method comprising the steps of:
    establishing a bias field relative to a magnetic bubble material;
    creating an undisturbed bubble array in said magnetic bubble material in one mode of operation, and shifting information from said magnetic bubble material in another mode of operation, with each mode of operation being under the control of a control means;
    positioning said document against said bubble material, with the areas of said document having magnetic indicia thereon creating a magnetic image of said document on the areas of said magnetic bubble material which are touching said magnetic indicia, by displacement of bubble in said magnetic bubble material; and
    activating said control means to initiate said one mode of operation to create said undisturbed bubble array in said magnetic bubble material, and following said positioning, initiating said another mode of operation to shift information from said magnetic bubble material.

2. The method of claim 1, further comprising the step of:
    thereafter transferring said magnetic image to a utilization device, such as a magnetic tape or the like.

3. Apparatus for recording information from a document having magnetic indicia thereon, said apparatus comprising:
    a magnetic bubble material;
    means for establishing a bias field relative to said bubble material;
    a controlled field means operative with said magnetic bubble material, and being operative in one mode to create an undisturbed bubble array in said magnetic bubble material, and being operable in another mode to enable shifting of information from said magnetic bubble material;
    means for positioning said document against said bubble material, with the areas of said document having magnetic indicia thereon creating a magnetic image of said document on the areas of said bubble material touching said magnetic indicia, by displacement of bubbles in said bubble material; and
    control means operable to activate said controlled field means in said one mode to create said undisturbed bubble array and, following the positioning of said document against said bubble material, operable to activate said controlled field means in said second mode to shift information from said magnetic bubble material.

4. The apparatus of claim 3, further comprising:
    means for transferring said magnetic image to a utilization device.

5. Apparatus for transferring information magnetically printed on a document, comprising:
    a transfer station;
    a planar magnetic bubble member positioned at said transfer station, said magnetic bubble member being sized dimensionally to be coextensive in size with information on said document;
    bias field means at said transfer station to establish a bias field co-extensive with said bubble member, said bias field means being arranged for activation to impart a polarized field through said bubble member, but with a sufficient gap to permit passage of a document into proximity with said bubble member;
    additional field means associated with and arranged for activation in conjunction with said bubble member, said additional field means being operable in a populate mode to fill said bubble member with a uniform and stable array of bubbles and further operable in a shift mode to enable shifting of information from said bubble member;
    positioning means actuatable for positioning a document at said transfer station for a transfer operation; and
    control means operable to activate said additional field means in a populate mode in order to fill said bubble member, to actuate said positioning means in order to position a document at said transfer station for transfer of information, and to activate said bias field means, whereby an image of the information on said document is induced in said magnetic bubble member.

6. The apparatus of claim 5 further comprising:
    pressure means at said transfer station, said pressure means being actuatable to press said bubble member and said document together during a transfer operation, and wherein said control means is operable to actuate said pressure means during transfer.

7. The apparatus of claim 5, wherein said positioning means is further actuatable to remove a document from said transfer station, and wherein:

said control means is further operable to actuate said positioning means in order to remove said document from said transfer station, and to thereafter activate said additional field means in a shift mode in order to shift information from said bubble member to a utilization device.

8. The apparatus of claim 7 wherein said positioning means comprises feed roll means operable to feed a document into and from said transfer station.

9. The apparatus of claim 5, further comprising:

hopper means for supplying and guiding a plurality of documents for positioning in succession at said transfer station.

10. The apparatus of claim 9, further comprising:

stacker means for receiving documents removed from said transfer station.

* * * * *